United States Patent
Pionetti et al.

(10) Patent No.: US 10,768,024 B2
(45) Date of Patent: Sep. 8, 2020

(54) METHOD FOR MONITORING THE THERMOMECHANICAL BEHAVIOUR OF A SUBSEA PIPE FOR TRANSPORTING PRESSURISED FLUIDS

(71) Applicants: SAIPEM S.A., Montigny le Bretonneux (FR); CEMENTYS, Paris (FR)

(72) Inventors: Francois-Regis Pionetti, La Baleine (FR); Jalil Agoumi, Le Kremlin-bicetre (FR); Axel Sundermann, Fontenay-les-briis (FR); Damien Maraval, Bagneux (FR); Vincent Lamour, Paris (FR)

(73) Assignee: Saipem S.A., Montigny le Bretonneux (FR)

( * ) Notice: Subject to any disclaimer, the term of this patent is extended or adjusted under 35 U.S.C. 154(b) by 259 days.

(21) Appl. No.: 16/075,053

(22) PCT Filed: Jan. 20, 2017

(86) PCT No.: PCT/FR2017/050120
§ 371 (c)(1),
(2) Date: Aug. 2, 2018

(87) PCT Pub. No.: WO2017/134360
PCT Pub. Date: Aug. 10, 2017

(65) Prior Publication Data
US 2019/0033102 A1    Jan. 31, 2019

(30) Foreign Application Priority Data
Feb. 2, 2016  (FR) ..................... 16 50826

(51) Int. Cl.
*G01D 5/353*  (2006.01)
*E21B 17/01*  (2006.01)
(Continued)

(52) U.S. Cl.
CPC ......... *G01D 5/35364* (2013.01); *E21B 17/01* (2013.01); *E21B 41/0007* (2013.01);
(Continued)

(58) Field of Classification Search
CPC .. G01D 5/35364; G01D 3/353; E21B 47/007; E21B 17/01; E21B 41/0007; G01H 9/004;
(Continued)

(56) References Cited

U.S. PATENT DOCUMENTS

2003/0174924 A1* 9/2003 Tennyson ................. G01L 1/242
                                                                        385/12
2011/0007996 A1* 1/2011 Huffman ............... G01M 11/085
                                                                        385/13
(Continued)

FOREIGN PATENT DOCUMENTS

| CA | 2910468   | 1/2016 |
|----|-----------|--------|
| CN | 101713638 | 5/2010 |
| CN | 102636730 | 8/2012 |

OTHER PUBLICATIONS

Alahbabi, Mohamed N., Yuh Tat Cho, and Trevor P. Newson. "Long-range distributed temperature and strain optical fibre sensor based on the coherent detection of spontaneous Brillouin scattering with in-line Raman amplification." Measurement Science and Technology 17.5 (2006): 1082. (Year: 2006).*

*Primary Examiner* — Dominic J Bologna
(74) *Attorney, Agent, or Firm* — Cozen O'Connor

(57) ABSTRACT

A method of monitoring thermomechanical behavior of an undersea pipe (2) transporting fluid under pressure and made by assembling unit pipe elements (4), comprising determining a mechanical signature specific to each unit pipe element, using a measurement cable (16) having an optical fiber sensor using Brillouin backscattering to measure deformation of the pipe element while it is subjected on land to various mechanical stresses in predetermined directions and
(Continued)

magnitudes, and establishing a stiffness matrix associated with the mechanical signature of each pipe element, a step of determining a thermal signature specific to each unit pipe element, which step consists in measuring the temperature changes of the unit pipe element while it is being subjected on land to various different electrical heating powers, and in establishing a thermal transfer function associated with the thermal signature of each pipe element, and a monitoring step consisting of recovering.

15 Claims, 2 Drawing Sheets

(51) Int. Cl.
*E21B 47/007* (2012.01)
*E21B 41/00* (2006.01)
*G01H 9/00* (2006.01)
*G01K 11/32* (2006.01)
*G01N 25/18* (2006.01)

(52) U.S. Cl.
CPC ........... *E21B 47/007* (2020.05); *G01D 5/353* (2013.01); *G01H 9/004* (2013.01); *G01K 11/32* (2013.01); *G01K 2011/322* (2013.01); *G01K 2011/324* (2013.01); *G01N 25/18* (2013.01)

(58) Field of Classification Search
CPC ............. G01K 11/32; G01K 2011/322; G01K 2011/324; G01N 25/18
See application file for complete search history.

(56) References Cited

U.S. PATENT DOCUMENTS

| | | | |
|---|---|---|---|
| 2015/0308909 A1* | 10/2015 | Carneal | G01M 5/0025 250/206 |
| 2016/0169807 A1* | 6/2016 | Uno | G01N 21/65 356/73.1 |
| 2016/0202133 A1* | 7/2016 | Francois | G01L 1/242 250/227.14 |
| 2017/0167949 A1* | 6/2017 | Xia | G01M 11/083 |
| 2017/0260848 A1* | 9/2017 | Xia | E21B 47/107 |
| 2018/0087999 A1* | 3/2018 | Carmona | G01M 5/0091 |

* cited by examiner

METHOD FOR MONITORING THE THERMOMECHANICAL BEHAVIOUR OF A SUBSEA PIPE FOR TRANSPORTING PRESSURISED FLUIDS

PRIORITY CLAIM

This is a U.S. national stage of application No. PCT/FR2017/050120, filed on Jan. 20, 2017. Priority is claimed on French Application No. FR1650826, filed Feb. 2, 2016, the content of which is incorporated here by reference.

BACKGROUND OF THE INVENTION

The present invention relates to the general field of undersea fluid transport pipes that rest on the sea bottom or that provide a bottom-to-surface connection for transporting hydrocarbons, e.g. oil and gas, from undersea production wells.

Undersea fluid transport pipes are commonly used in offshore hydrocarbon production. Thus, in an offshore production field, a plurality of wells are generally worked, which wells may be spaced apart from one another by several kilometers, or indeed tens of kilometers. The fluids coming from the various wells need to be collected by pipes that are laid on the sea bottom and transferred by bottom-to-surface connection pipes from an undersea pipe resting on the sea bottom to a surface installation that receives them, e.g. on board a ship or at a collection point situated onshore.

There exist various types of undersea pipes that are used for transporting fluids. The invention relates more particularly to coaxial pipes of the pipe in pipe (PIP) type, in which an inner steel tube transports the fluids and an outer steel tube coaxial with the internal tube, and also referred to as the "outer shell", is in contact with the surrounding medium, i.e. with the water.

In general, such coaxial pipes are assembled on land from unit lengths (referred to as double, triple, or quadruple "joints", with the term "quad-joints" being used herein for quadruple sections of tube), which unit lengths present a length lying in the range 10 meters (m) to 100 m, depending on the load-holding capacity of the laying system. Such quad-joints are then taken to sea on a laying ship.

During laying, the quad-joints are connected to one another on board the ship progressively as they are being laid at sea. This laying may be performed by using a J-lay tower positioned on the laying ship. With J-laying, the undersea pipe is typically lowered from the laying ship while it is practically vertical (at an angle in the range +30° to −10° relative to the vertical). J-laying is single-catenary laying in which the almost vertical angle of inclination of the pipe decreases progressively as it moves downwards until it takes on the slope of the sea bottom.

Given their specificity, undersea fluid transport pipes are designed to achieve a high level of thermal performance, and specific versions have been developed to be better adapted to great depths, i.e. to withstand pressure at the bottom of the sea. Specifically, since the pressure of water is substantially 0.1 megapascals (MPa), i.e. about 1 bar, for a depth of 10 m, the pressure that undersea pipes need to be able to withstand is then about 10 MPa, i.e. about 100 bar, for a depth of 1000 m, and about 30 MPa, i.e. about 300 bar, for a depth of 3000 m.

Furthermore, undersea pipes are subjected to high levels of mechanical stress, both while they are being laid on the bottom of the sea via a J-lay tower, which gives rise to high levels of deformation (in particular in bending) in each of the quad-joints of the pipe, and also during the production stage (internal thermal stresses and stresses due to external forces). Specifically, once the undersea pipe has been installed on the bottom of the sea and the network is in production, the inner tubes of the quad-joints of the pipe are subjected to the high pressure of the fluids they are transporting (which pressure can exceed 100 bar). Furthermore, it often happens that the sea bottom on which the pipe is resting moves, which gives rise to movements of the pipe, and thus to stresses in them.

However, the mechanical stresses to which undersea pipes are subjected, and more particularly the inner tubes of PIP pipes, and also the temperatures to which they are subjected (hydrocarbons coming from undersea production wells are at a temperature of about 70° C.), run the risk of leading to major damage or even breakage of the pipes.

OBJECT AND SUMMARY OF THE INVENTION

There thus exists a need to be able to monitor the thermomechanical integrity of an undersea pipe for transporting fluids, both while it is being laid and also during a stage of production.

In accordance with the invention, this need is satisfied by means of a method of monitoring the thermomechanical behavior of an undersea pipe for transporting fluid under pressure, the undersea pipe being made by assembling together a plurality of unit pipe elements arranged end to end, the method comprising:

a step of determining a mechanical signature specific to each unit pipe element, which step consists in using at least one measurement cable having at least one optical fiber sensor using at least Brillouin backscattering and positioned along the entire length of the unit pipe element to measure the deformations experienced by or simulated on said unit pipe element while it is being subjected on land to various different mechanical stresses in predetermined directions and of predetermined magnitudes, and, on the basis of the deformation measurements, in establishing a stiffness matrix associated with the mechanical signature of the unit pipe element;

a step of determining a thermal signature specific to each unit pipe element, which step consists in using at least one measurement cable provided with at least one optical fiber sensor using at least Raman backscattering and positioned along the entire length of the unit pipe element to measure temperature changes of said unit pipe element while it is being subjected on land to various different electrical heating powers, and, on the basis of these temperature measurements, in establishing a thermal transfer function associated with the thermal signature of the unit pipe element; and a monitoring step consisting in recovering the variations in the optical signal injected into the optical fiber sensors while the pipe is in service, and on the basis of these variations in the optical signal, in determining any changes in the mechanical and thermal signatures of each unit pipe element.

Herein, a pipe is said to be "in service" either while the pipe is being laid, or else while it is operational during a stage of production from the network.

The monitoring method of the invention is remarkable in that it makes use of mechanical and thermal signatures that are specific to each unit element (or quad-joint) of the undersea pipe for monitoring the temperature and the mechanical stresses to which the pipe is subjected. Prior to being laid, during the step of determining a mechanical signature, each unit pipe element is tested on land (in a laboratory or a factory) and it is subjected to various different mechanical stresses of predetermined directions and magnitudes. The deformations experienced by or simulated on the unit pipe element are measured by optical fiber sensors (each optical fiber sensor is associated with measuring one deformation parameter of the unit pipe element). During the monitoring step proper, the measurements taken by the optical fiber sensors are used to determine changes in the mechanical signatures specific to each unit pipe element, and thus to track the deformations to which each of the unit pipe elements are subjected in service. On the basis of knowledge about the mechanical behavior of each unit pipe element, it is then possible to reconstruct the overall mechanical behavior of the undersea pipe, both while it is being laid and also during a production stage. In particular, the signatures of each of the unit pipe elements constitute references that make it possible to locate events throughout the lifetime of the pipe.

The method of the invention is also most particularly suitable for the J-laying technique for laying an undersea pipe, during which no permanent deformation is imparted to the pipe (the pipe remains below 90% of its elastic limit). Once it has been laid, the pipe continues to remain in a linear domain (below 66% of its elastic limit), which means that the disturbing phenomena experienced by the pipe (such as deformations) can be linearized.

Likewise, prior to being laid, during the step of determining a thermal signature, each unit pipe element is subjected to various different heating powers. Changes in the temperature of the unit pipe element are measured by the optical fiber sensor using Raman backscattering. These temperature changes, which are specific to each unit pipe element, make it possible to determine thermal transfer functions having values that correspond to the temperature rise values experienced by the unit pipe element. During the monitoring step proper, the measurements performed by the optical fiber sensor using Raman backscattering are used to determine any changes in the thermal signature specific to each unit pipe element, and thus to track the temperatures seen in service by each of the unit pipe elements. Knowledge of changes in the thermal signature of each unit pipe element serves in particular to monitor the operation of the electric heater cables and to observe ageing of the insulation and the appearance of layers of hydrates in the pipe.

The monitoring method of the invention also makes it possible to have accurate knowledge about the state of the undersea pipe at the connections between the various unit pipe elements, which is not possible with a single measurement line over the entire length of the pipe.

The stiffness matrix associated with the mechanical signature of each unit pipe element may comprise values corresponding to the values of deformations experienced by the unit pipe element while it was being subjected on land to various different mechanical stresses. Thus, the stiffness matrix that is set up using these measurements represents the mechanical identity specific to each unit pipe element. Under such circumstances, determining the deformations experienced by each unit pipe element in service makes it possible to calculate the stiffness matrix associated with the mechanical signature of each unit pipe element.

Likewise, the thermal transfer function associated with the thermal signature of each unit pipe element may comprise values corresponding to the values of the temperature rises experienced by the unit pipe element while being subjected on land to various different heating powers. Under such circumstances, the temperature seen in service by each of the unit pipe elements makes it possible to calculate the thermal transfer functions.

The mechanical stresses of predetermined directions and amplitudes applied on land to each unit pipe element may comprise one or more of the following stresses: twisting stress; traction/compression stress; bending stress; and pressure stress.

The optical fiber sensor measurement cables may be positioned on the unit pipe elements in such a manner as to extend substantially parallel to a longitudinal axis of said pipe.

Preferably, the measurement cable optical fiber sensors that use Brillouin and Rayleigh backscattering are monomode fibers and the measurement cable optical fiber sensors that use Raman backscattering are multimode fibers.

In an application to monitoring a PIP pipe, each unit pipe element may comprise an inner tube mounted coaxially inside an outer tube, the optical fiber sensor measurement cables being positioned on the inner tube of said unit pipe element.

Also in advantageous manner, the method further comprises:

a step of determining an acoustic and vibratory signature specific to each unit pipe element, the step consisting in using the measurement cable having the optical fiber sensor that uses at least Rayleigh backscattering and that is positioned along the entire length of the unit pipe element to measure the frequency variations of each unit pipe element while it is being subjected on land to various different acoustic and vibratory stresses, and on the basis of these noise variations, to establish an acoustic signature for each unit pipe element; and a step of monitoring the acoustic and vibratory integrity of the pipe, which step consists in recovering the frequency variations of the optical signal injected into the optical fiber sensors while the pipe is in service, and on the basis of the frequency variations, in determining any changes in the acoustic and vibratory signature of each unit pipe element.

Thus, the optical fiber sensors that use Brillouin backscattering can not only provide information about the mechanical stresses experienced by the pipe, but can also provide information about variations in surrounding sources of vibration. Among such surrounding sources of vibration, it is possible in particular to distinguish between those generated by the unit pipe element on which the optical fiber sensors are positioned, and those generated by the outside environment (specifically the sea bottom and anything connected thereto). On the basis of such induced vibration, the integrity of the pipe may be monitored on the basis of changes in the acoustic and vibratory signatures of each of the unit pipe elements.

Typically, the noise variations detected inside the pipe make it possible to determine the proportions of the flowing fluid phases and their respective speeds. In particular, for production pipes, it is thus possible to detect the formation of pockets of gas that can give rise to large amounts of damage due to low-frequency vibration. Continuous noise variations can make it possible to detect heavy grease forming on the walls of the pipe, which reduces flow and locally increases the speed of the fluid. Noise variations can also be symptomatic of the pipe moving (by expanding laterally or vertically) potentially giving rise to (fatigue) damage of the pipe.

Noise variations outside of the undersea pipe are useful in particular during an external programmed intervention on the pipe (e.g. inspection by means of a remotely controlled undersea vehicle). Specifically, during such interventions, recognizing noise variations makes it possible to determine to within 1 m the position of the controlled vehicle relative to the undersea pipe, thereby enabling the vehicle to be guided better and enabling its external view to be correlated with the acoustic view internal to the pipe. Other outside noises can be evaluated and extracted from analyses of the behavior of the pipe since they correspond to known natural physical phenomena such as landslides or tsunamis that can be heard from far away and that are not likely to damage the pipe.

The acoustic and vibratory stresses applied on land to each unit pipe element may comprise: emitting noises inside of the unit pipe element filled with air via a bar connecting together the two ends of said unit pipe element, emitting noises inside of the unit pipe element filled with water via a bar connecting together the two ends of said unit pipe element, and setting the entire unit pipe element into vibration by means of vibrating studs.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF THE INVENTION

Figure 1:
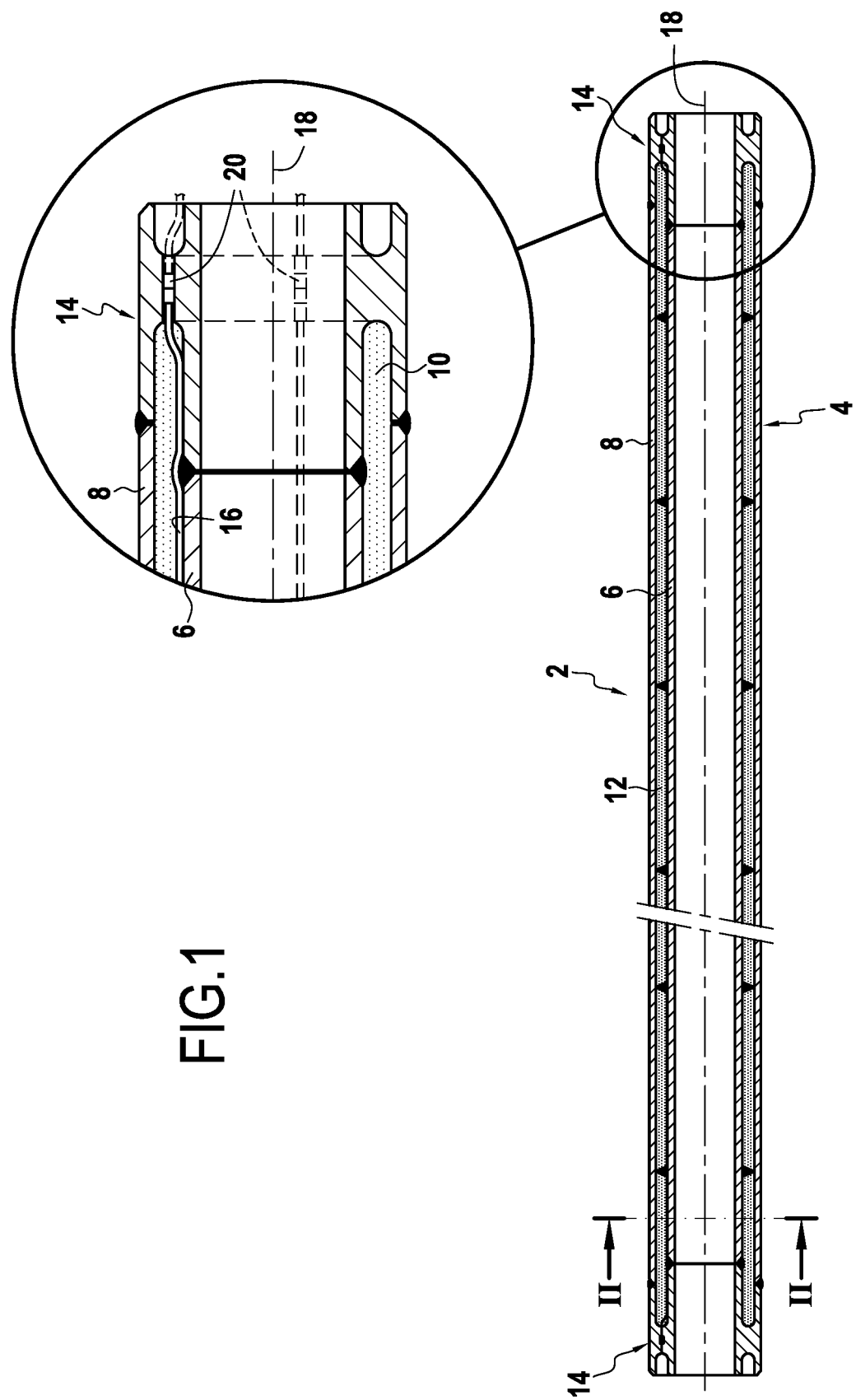
FIG. 1 is a diagrammatic view of an undersea PIP pipe to which it is possible to apply the monitoring method of the invention.
Figure 2:
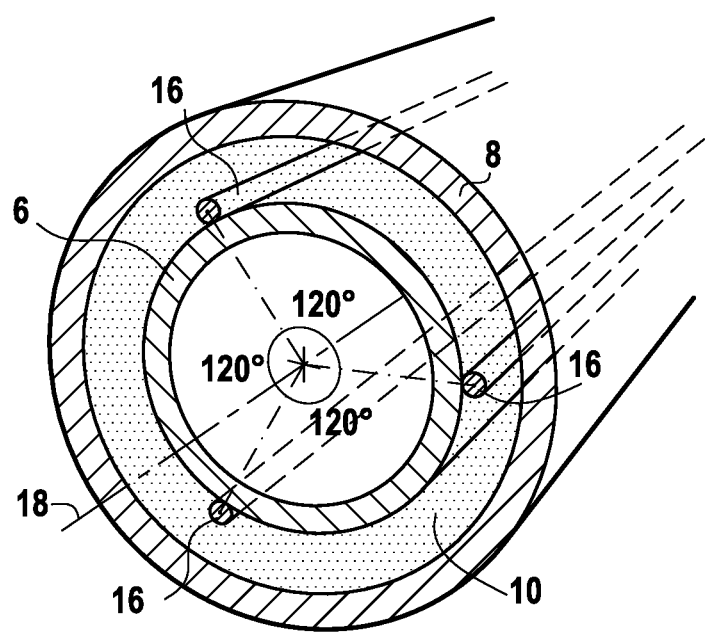
FIG. 2 is a section view on II-II of FIG. 1.

The invention applies to any undersea pipe resting on the sea bottom and serving to transport specifically oil and gas between undersea hydrocarbon production wells and a surface installation, such as the undersea pipe 2 shown in FIGS. 1 and 2.

The undersea pipe 2 shown in the figures is typically assembled on land as a plurality of pipe sections 4 each having a unit length of about 10 m to 100 m, depending on the load-holding capacity of the laying system. The term "joints" is also used, in particular "double joints" for two unit pipe elements assembled together, "triple joints" for three unit pipe elements assembled together, "quadruple joints" for four unit pipe elements assembled together, etc. In the description below, the term "quad-joint" is used generically to designate any unit pipe element 4. During laying, the quad-joints 4 are connected to one another on board the ship progressively as they are being laid at sea.

Furthermore, the undersea pipe 2 is a coaxial pipe of the pipe in pipe (PIP) type, i.e. each quad-joint (or unit pipe element) 4 comprises an inner steel tube 6 for transporting hydrocarbons from production wells, and an outer steel tube 8 that is coaxial about the inner tube and that is referred to as the "outer shell", which outer tube is in direct contact with the surrounding water.

In known manner, the annular space 10 formed between the inner tube 6 and the outer tube 8 of each quad-joint 4 may be filled with an insulating material 12 (or may have gas evacuated therefrom) so as to form a thermally insulating layer that limits the loss of heat to the surrounding medium.

At each of its ends, the inner tube 6 may be secured to the outer tube 8 via junction parts 14 that close the annular space 10.

According to the invention, provision is made to monitor the thermomechanical integrity of such an undersea pipe 2, i.e. to monitor variation in mechanical and thermal signatures of each of the unit pipe elements making it up, both during laying on the sea bottom and also during production by the network (i.e. while it is in service).

The monitoring method of the invention provides for two main steps: steps referred to as "initial measurement" (or calibration) steps, during which the initial mechanical signature, the initial thermal signature, and the initial acoustic and vibratory signature of each quad-joint of the undersea pipe are determined; and a monitoring step proper during which variations in the mechanical, thermal, and acoustic and vibratory signatures are determined on the basis of thermomechanical stresses applied to each quad-joint and on the basis of measurements taken by optical fiber sensors while the undersea pipe is being laid and/or during production from the network.

Mechanical Calibration Step

This mechanical calibration step consists in testing each quad-joint of the undersea pipe on land in order to obtain its initial mechanical signature.

For this purpose, each quad-joint is subjected in a laboratory or a factory to a series of various different mechanical stresses in predetermined directions and of predetermined magnitudes, and the deformations experienced by the quad-joint during the testing are measured by optical fiber sensors.

More precisely, the quad-joint 4 is fitted with measurement cables 16 provided with optical fiber sensors, each optical fiber sensor being for measuring a single corresponding deformation parameter of the quad-joint.

The measurement cables 16 are to be positioned on the inner tube 6 of the quad-joint 4 (by way of example, they may be adhesively bonded to its outside surface) and they are to extend longitudinally between the two ends of the quad-joint. For example, in the example shown in FIG. 2, there are three measurement cables 16 that extend parallel to the longitudinal axis 18 of the quad-joint and that are spaced apart from one another by 120°. Naturally, it is possible to envisage other configurations of measurement cables.

The optical fibers in the measurement cables 16 are monomode fibers making use of Brillouin and Rayleigh backscattering for sensors that are to measure the mechanical stresses to which the quad-joint is subjected and the variations in acoustic and vibratory noise, and a multimode fiber using Raman backscattering for the sensor that is to measure the temperature of the quad-joint (during the thermal calibration step, described below).

In the example described below, the mechanical stresses applied to the quad-joints of the undersea pipe are the following: twisting stress (about the longitudinal axis 18 of the quad-joints); bending stress (in a YZ plane transverse to the quad-joints); traction/compression stress (along the direction of the longitudinal axis of the quad-joints); and pressure stress internal to the quad-joints.

Figure 3:
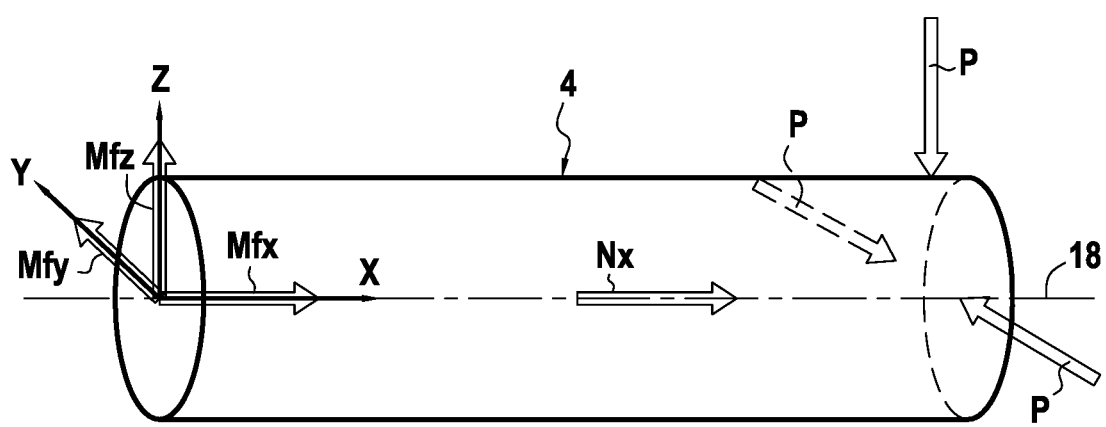
FIG. 3 is a diagrammatic view of a unit undersea pipe element to which various different mechanical stresses are applied in order to establish its mechanical signature.

All of the stresses are defined by respective application directions and magnitudes that are predetermined. Thus, as shown in FIG. 3, the twisting stress applied to the quad-joint 4 consists in creating a twisting moment (represented by Mtx in FIG. 3) having as its application direction the X axis of an (O, X, Y, Z) rectangular reference frame specific to the quad-joint. Likewise, the bending stress applied to the quad-joint consists in creating two bending moments (represented by Mfy and Mfz in FIG. 3) having respective application directions along the Y and Z axes of the (0, X, Y, Z) reference frame. The traction/compression stress applied to the quad-joint (shown in FIG. 3 by Nx) has an application direction along the X axis. Finally, the pressure stress is represented by P in FIG. 3 and its application direction is radial relative to the pipe.

During the test, the various different above-described stresses are applied to each quad-joint, and an optoelectronic measurement apparatus of the optical time domain reflectometer (OTDR) type, as is commonly used for characterizing optical fibers, serves to measure the deformation values, written $\varepsilon_i$, to which the quad-joint is subjected.

As mentioned above, each optical fiber sensor measures a single deformation value $\varepsilon_i$, such that in order to obtain all of the deformation values of the quad-joint corresponding to the above-described stresses Mtx, Mfy, Mfz, Nx, and P, it is necessary to have five different optical fiber sensors for a single quad-joint.

Thus, by means of the measurements $\varepsilon_1$ to $\varepsilon_5$ obtained by the five optical fiber sensors, it is possible, for elastic materials, to obtain the stiffness matrix Q that satisfies following equation (1):

$$\begin{pmatrix} \varepsilon 1 \\ \varepsilon 2 \\ \varepsilon 3 \\ \varepsilon 4 \\ \varepsilon 5 \end{pmatrix} = \begin{pmatrix} a11 & a12 & a13 & a14 & a15 \\ a21 & a22 & a23 & a24 & a25 \\ a31 & a32 & a33 & a34 & a35 \\ a41 & a42 & a43 & a44 & a45 \\ a51 & a52 & a53 & a54 & a55 \end{pmatrix} \times \begin{pmatrix} Mtx \\ Mfy \\ Mfz \\ Nx \\ P \end{pmatrix} \quad (1)$$

From the deformation values $\varepsilon_1$ to $\varepsilon_5$ measured by the optical fiber sensors and from the intensity values Mtx, Mfy, Mfz, Nx of the various different mechanical stresses applied to the quad-joint during the calibration step, it is then possible to determine all of the parameters a11, a12, ..., a55 of the stiffness matrix Q specific to the quad-joint. Since the optical fibers run along different paths on the surface of the inner tube of the quad-joint, this matrix is invertible. During the mechanical calibration tests, the stresses must be kept within the elastic domain of the materials constituting the quad-joint.

This stiffness matrix Ω constitutes a mechanical signature that is specific to each quad-joint for making up the undersea pipe. Specifically, the parameters and the tolerances of the component materials (concentricity and thicknesses of the tubes, stiffnesses of the insulation in the annulus and of the spacers, characteristics of welded joints, etc.) are different for each quad-joint, such that the stiffness matrix varies from one quad-joint to another.

The mechanical signatures are in the form of digital files that are stored in a memory of a computer system on board the laying ship and/or the surface installation, for subsequent use in monitoring the mechanical behavior of the undersea pipe during the monitoring step proper, as described below.

Thermal Calibration Step

This thermal calibration step takes place under the same operating conditions as mechanical calibration, i.e. each quad-joint of the undersea pipe is fitted with at least one measurement cable provided with at least one optical fiber sensor using at least Raman backscattering. The optical fiber sensor, typically a multimode sensor, is more precisely inserted inside one of the measurement cables 16 fitted to each quad-joint.

Each quad-joint fitted in this way is then subjected to various different levels of electric heating power while on land (i.e. in a laboratory or a factory). The temperature variations of each quad-joint subjected to such heating powers are measured by an optical time domain reflectometer (OTDR) used for characterizing the optical fiber sensors that make use of Raman backscattering.

From these temperature variations, it is possible to determine the thermal signature of each quad-joint, which thermal signature comprises thermal transfer functions a(t) and b(t) correlating the heat power injected at an instant (t) with the temperature rise, and thus satisfying following equation (2):

$$T(t) = a(t) \times P_{electrical} + b(t) \quad (2)$$

In this equation, T(t) represents the variation in the temperature of the inner tube of each quad-joint measured by the optical fiber sensor, and $P_{electrical}$ corresponds to the electrical power injected into the heater system. Thus, the values of the thermal transfer functions a(t) and b(t) correspond to the temperature rise values experienced by the inner tube of the quad-joint when it is subjected to various different heating powers on land.

As for the mechanical signatures, the thermal signatures of the quad-joint are in the form of digital files that are stored in a memory of the computer system on board the laying ship and/or the surface installation, for subsequent use in monitoring the mechanical behavior of the undersea pipe during the monitoring step proper.

Acoustic Calibration Step

This acoustic calibration step takes place under the same operating conditions as the mechanical calibration stage. Each quad-joint fitted with its optical fiber sensor using Brillouin backscattering is subjected to various different acoustic and vibratory stresses on land (i.e. in a laboratory or in a factory).

These acoustic stresses comprise emitting noises (in a working frequency spectrum typically ranging from 0 to 50 kHz) in various configurations: emitting noises inside the quad-joint filled with air via a bar connecting together the two ends of the quad-joint; emitting noises into the inside of the quad-joint filled with water via a bar connecting together its two ends; and by emitting noises outside the quad-joint previously filled with air and then with water by using a protocol that is calibrated for each quad-joint (e.g. by means of a system that emits calibrated sound vibration). The vibratory stresses may be provided by setting the entire unit pipe element into vibration by means of vibrating studs.

Each time noise or vibration is emitted during this calibration step, the optical time domain reflectometer (OTDR) that is used for characterizing the optical fiber sensors also serves to measure the frequency variations of the quad-joint. By way of example, these measurements are in the form of a matrix and constitute the acoustic and vibratory signature for each quad-joint (i.e. its base reference).

As for the mechanical and thermal signatures, the acoustic signatures of all of the quad-joints are in the form of digital files that are stored in a memory of the computer system on board the laying ship and/or the surface installation, for subsequent use in monitoring the behavior of the undersea pipe during the monitoring step proper, as described below.

Monitoring Step

During this step, the various quad-joints 4 that are to make up the undersea pipe 2 are connected to one another on board the ship progressively while they are being laid at sea, as is known to the person skilled in the art.

This connection implies in particular that the measurement cables 16 installed on the inner tubes 6 of the various quad-joints are connected to one another, e.g. by causing them to pass through holes 20 formed in the junction parts 14 (see the detail of FIG. 1).

Furthermore, during laying, the quad-joints 4 are indexed in rotation relative to one another, i.e. the (0, X, Y, Z) reference frame specific to each quad-joint is identified both in rotation and in translation in a more general reference frame by means of a geographical information system (GIS).

During laying, and throughout the stage in which the network is in production, the measurements taken by optical time domain reflectometry (OTDR) of the optical fiber sensors using Brillouin backscattering are analyzed in order to determine the behavior of the undersea pipe faced with the deformation to which it might be subjected. This step of recovering and analyzing measurements taken by optical time domain reflectometry may be performed by the computer system provided with suitable software means and present on board the laying ship and/or the surface installation.

In particular, by means of calculation software fitted to the measurement-collecting computer system, it is possible to calculate the values of the deformations Mtx, Mfy, Mfz, Nx to which each quad-joint is subjected. Starting from the above-described equation (1), it is also possible to determine how the mechanical signature of each quad-joint varies, with the mechanical signature being given by equation (3) below:

$$\begin{pmatrix} a11 & a12 & a13 & a14 & a15 \\ a21 & a22 & a23 & a24 & a25 \\ a31 & a32 & a33 & a34 & a35 \\ a41 & a42 & a43 & a44 & a45 \\ a51 & a52 & a53 & a54 & a55 \end{pmatrix} = \begin{pmatrix} \varepsilon 1 \\ \varepsilon 2 \\ \varepsilon 3 \\ \varepsilon 4 \\ \varepsilon 5 \end{pmatrix} \times \begin{pmatrix} Mtx \\ Mfy \\ Mfz \\ Nx \\ P \end{pmatrix}^{-1} \quad (3)$$

As a result, by following the variation in the mechanical signatures of the quad-joints, it is possible, at all times during laying of the undersea pipe and throughout the stage in which the network is in production, to have knowledge about the mechanical integrity of the pipe on the basis of the stresses to which each quad-joint making up the undersea pipe is subjected. In particular, it is thus possible to identify accurately the location at which the undersea pipe is subjected to a large amount of deformation that might lead to major damage (mechanical damage identified by a drop of stiffness), or even to breakage of the pipe, or to a plug becoming formed inside the pipe that could also lead to breakage of the pipe. Locating this position is made possible by the calibration stages that make it possible to know accurately the lengths and the locations of the fibers deployed in the undersea pipe.

Throughout the stage in which the network is in production, the thermal signatures of the undersea pipe are monitored on the basis of thermal variations to which the pipe is subjected.

More precisely, starting from above-described equation (2) and from the data collected by optical time domain reflectometry (OTDR) of the optical fiber sensors using backscattering, it is possible with the help of the calculation software in the computer system to determine how temperatures vary in the inner tube of the undersea pipe at all times (and in particular throughout the stage of production), at each location thereof, and as a function of the electrical power injected into the heater system of the pipe (where such injection is typically performed using electric cables wound around the inner tubes of the quad-joints in order to heat them by the Joule effect). Such determination of the thermal signatures specific to each quad-joint of the pipe as a function of the electrical heater power is made possible by the presence of the optical fiber sensors.

Monitoring the variation of the temperature of the inner tubes of the quad-joints of the undersea pipe as a function of the injected electrical power presents numerous advantages. In particular, it makes it possible to monitor the operation of the electric heater cables and to observe any degradation in the thermal signatures of the quad-joints of the pipe. Specifically, degradation of the thermal signatures is characteristic of ageing of the insulation of the pipe (by condensation or loss of vacuum) or of the appearance of layers of hydrates in the inner pipe.

Monitoring of the acoustic and vibratory signatures of the undersea pipe is performed by comparing the measurements taken throughout the stage of production in the network by optical time domain reflectometry (OTDR) of the optical fiber sensors using Brillouin backscattering with the acoustic and vibratory signatures established for each quad-joint during the acoustic calibration step.

This step of recovering and analyzing measurements taken by optical time domain reflectometry may be performed by the computer system provided with suitable software means and present on board the laying ship and/or the surface installation.

It should be observed that the mechanical and thermal signatures specific to each quad-joint may also be used for monitoring the fabrication quality of the quad-joints by verifying that the parameters of the stiffness matrix and the thermal backscattering functions of each quad-joint remain within a predefined range of values.

The invention claimed is:

1. A method of monitoring the thermomechanical behavior of an undersea pipe for transporting fluid under pressure, the undersea pipe being made by assembling together a plurality of unit pipe elements arranged end to end, the method comprising:

a step of determining a mechanical signature specific to each unit pipe element, which step consists in using at least one measurement cable having at least one optical fiber sensor using at least Brillouin backscattering and positioned along the entire length of the unit pipe element to measure the deformations experienced by or simulated on said unit pipe element while it is being subjected on land to various different mechanical stresses in predetermined directions and of predetermined magnitudes, and, on the basis of the deformation measurements, in establishing a stiffness matrix associated with the mechanical signature of the unit pipe element;

a step of determining a thermal signature specific to each unit pipe element, which step consists in using at least one measurement cable provided with at least one optical fiber sensor using at least Raman backscattering and positioned along the entire length of the unit pipe element to measure temperature changes of said unit pipe element while it is being subjected on land to various different electrical heating powers, and, on the basis of these temperature measurements, in establishing a thermal transfer function associated with the thermal signature of the unit pipe element; and a monitoring step consisting in recovering the variations in the optical signal injected into the optical fiber sensors while the pipe is in service, and on the basis of these variations in the optical signal, in determining any changes in the mechanical and thermal signatures of each unit pipe element.

2. The method according to claim 1, wherein the stiffness matrix associated with the mechanical signature of each unit pipe element comprises values corresponding to the values of deformation experienced by the unit pipe element while being subjected on land to the various different mechanical stresses, and wherein the thermal transfer function associated with the thermal signature of each unit pipe element comprises values corresponding to the temperature rise values experienced by the unit pipe element while being subjected on land to various different heating powers.

3. The method according to claim 2, wherein determining the deformations experienced by each unit pipe element makes it possible to calculate the values of the stiffness matrix associated with the mechanical signature of each unit pipe element.

4. The method according to claim 3, wherein the mechanical stresses of predetermined directions and amplitudes applied on land to each unit pipe element comprise one or more of the following stresses: twisting stress; traction/compression stress; bending stress; and
pressure stress.

5. The method according to claim 1, wherein the mechanical stresses of predetermined directions and amplitudes applied on land to each unit pipe element comprise one or more of the following stresses: twisting stress; traction/compression stress; bending stress; and pressure stress.

6. The method according to claim 5, wherein the optical fiber sensor measurement cables are positioned on the unit pipe elements in such a manner as to extend substantially parallel to a longitudinal axis of said pipe.

7. The method according to claim 1, wherein the optical fiber sensor measurement cables are positioned on the unit pipe elements in such a manner as to extend substantially parallel to a longitudinal axis of said pipe.

8. The method according to claim 7, wherein the measurement cable optical fiber sensors that use Brillouin backscattering are monomode fibers.

9. The method according to claim 1, wherein the measurement cable optical fiber sensors that use Brillouin backscattering are monomode fibers.

10. The method according to claim 9, wherein the measurement cable optical fiber sensors that use Raman backscattering are multimode fibers.

11. The method according to claim 1, wherein the measurement cable optical fiber sensors that use Raman backscattering are multimode fibers.

12. The method according to claim 11, wherein each unit pipe element comprises an inner tube mounted coaxially inside an outer tube, the optical fiber sensor measurement cables being positioned on the inner tube of said unit pipe element.

13. The method according to claim 1, wherein each unit pipe element comprises an inner tube mounted coaxially inside an outer tube, the optical fiber sensor measurement cables being positioned on the inner tube of said unit pipe element.

14. The method according to claim 1, further comprising:
a step of determining an acoustic and vibratory signature specific to each unit pipe element, the step consisting in using the measurement cable having the optical fiber sensor that uses at least Brillouin backscattering and that is positioned along the entire length of the unit pipe element to measure the frequency variations of each unit pipe element while it is being subjected on land to various different acoustic and vibratory stresses, and on the basis of these noise variations, to establish an acoustic signature for each unit pipe element; and
a step of monitoring the acoustic and vibratory integrity of the pipe, which step consists in recovering the frequency variations of the optical signal injected into the optical fiber sensors while the pipe is in service, and on the basis of the frequency variations, in determining any changes in the acoustic and vibratory signature of each unit pipe element.

15. The method according to claim 14, wherein the acoustic and vibratory stresses applied on land to each unit pipe element comprise: emitting noises inside of the unit pipe element filled with air via a bar connecting together the two ends of said unit pipe element, emitting noises inside of the unit pipe element filled with water via a bar connecting together the two ends of said unit pipe element, and setting the entire unit pipe element into vibration by means of vibrating studs.

* * * * *

UNITED STATES PATENT AND TRADEMARK OFFICE
CERTIFICATE OF CORRECTION

PATENT NO. : 10,768,024 B2
APPLICATION NO. : 16/075053
DATED : September 8, 2020
INVENTOR(S) : Francois-Regis Pionetti et al.

Page 1 of 1

It is certified that error appears in the above-identified patent and that said Letters Patent is hereby corrected as shown below:

(73) Assignees should read:
SAIPEM S.A.    MONTIGNY LE BRETONNEUX, FRANCE
CEMENTYS    PARIS, FRANCE Signed and Sealed this
First Day of June, 2021

Drew Hirshfeld
*Performing the Functions and Duties of the*
*Under Secretary of Commerce for Intellectual Property and*
*Director of the United States Patent and Trademark Office*